United States Patent
Motoori

[11] Patent Number: 5,933,426
[45] Date of Patent: Aug. 3, 1999

[54] INTERFACE APPARATUS OF ATM/STM COEXISTENCE NETWORK SYSTEM

[75] Inventor: Hideyuki Motoori, Kawasaki, Japan

[73] Assignee: Fujitsu Limited, Kanagawa, Japan

[21] Appl. No.: 08/725,140

[22] Filed: Oct. 2, 1996

[30] Foreign Application Priority Data

Apr. 11, 1996 [JP] Japan .................................. 8-089362

[51] Int. Cl.⁶ ................................................ H04L 12/66
[52] U.S. Cl. .................... 370/352; 370/392; 370/395; 370/466
[58] Field of Search ..................... 370/464, 465, 370/466, 471, 395, 398, 352, 351, 360, 392

[56] References Cited

U.S. PATENT DOCUMENTS

| | | | |
|---|---|---|---|
| 5,144,619 | 9/1992 | Munter | 370/395 |
| 5,204,857 | 4/1993 | Obara | 370/395 |
| 5,287,348 | 2/1994 | Schmidt et al. | 370/352 |
| 5,301,189 | 4/1994 | Schmidt et al. | 370/474 |
| 5,359,600 | 10/1994 | Ueda et al. | 370/395 |
| 5,428,609 | 6/1995 | Eng et al. | 370/352 |
| 5,568,475 | 10/1996 | Doshi et al. | 370/352 |

*Primary Examiner*—Ajit Patel
*Attorney, Agent, or Firm*—Helfgott & Karas, P.C.

[57] ABSTRACT

An interface apparatus of an ATM/STM coexistence network system includes a first converter for converting a first input signal of a synchronous transfer mode into a signal with a cell format having an additional address for an asynchronous transfer mode and outputting the signal with the cell format as a first asynchronous transfer mode cell and a second converter for extracting an asynchronous transfer mode cell from a second input signal in which the asynchronous transfer mode cell is multiplexed in the synchronous transfer mode and outputting the extracted asynchronous transmission mode cell as a second asynchronous transmission mode cell. The interface apparatus further includes an output-destination controller for determining output destinations in accordance with addresses shown in the first and second asynchronous transfer mode cells.

5 Claims, 17 Drawing Sheets

INTERFACE APPARATUS OF ATM/STM COEXISTENCE NETWORK SYSTEM

BACKGROUND OF THE INVENTION

1. Field of the Invention

The present invention generally relates to an ATM (Asynchronous Transfer Mode)/STM (Synchronous Transfer Mode) coexistence network system and more particularly to an interface apparatus of the ATM/STM coexistence network system.

2. Description of the Related Art

In the existing telephone-service exchange network in North America which network provides the existing narrow-band digital optical subscriber market mainly with telephone services, digital loop carrier systems are installed at the exchange and at the subscriber's home. By virtue of an ATM exchange provided in such an area, the demand for installation of subscriber apparatuses for providing broad-band transmission services is rising vary fast.

In the existing system, the STM communication method which is entirely different from the ATM communication method is adopted. In the ATM/STM coexistence network system provided by the present invention, the STM method is mixed with the multiplexing/demultiplexing ATM method serving as a means for carrying out batch transmission of services having different frequency bands. In this way, services can be provided to the subscriber's home by using both the methods with the highest degree of efficiency without the need to modify the existing facilities.

Traditionally, the conventional synchronous system adopting the STM method is used for providing telephone services. As shown in FIG. 16, the conventional system which is used for providing telephone services comprises an existing telephone-service apparatus 1 and a telephone set 2 at the subscriber's home. The telephone set 2 is connected to the existing telephone-service apparatus 1 by means of a synchronous clock signal through an NBS (Narrow-Band Service) supplying apparatus 3 which is shown in detail in FIG. 17. The existing telephone-service apparatus 1 shown in FIG. 16 comprises an STM exchange 4, a central office terminal 5 connected to the STM exchange 4 and a CMS (Common-Shelf) apparatus 6, a remote terminal which has an audio-signal processing function such as a DS0 cross connect and SONET (Synchronous Optical Network) multiplexing/demultiplexing of the telephone-service system.

As shown in FIG. 17, the NBS supplying apparatus 3 connected between the CMS apparatus 6 and the telephone set 2 comprises an STS-1 transmission receiving circuit 8, a synchronous format conversion circuit 9, a multiplexing conversion/framer circuit 10 and an analog-signal D/A (Digital-to-Analog) conversion circuit 11 which are connected to the CMS apparatus 6 in series in a direction from the CMS apparatus 6 to the telephone set 2 referred to hereinafter as the downward direction. In addition, the NBS supplying apparatus 3 also includes an audio-signal A/D (Analog-to-Digital) conversion circuit 12, a multiplexing inverse conversion/deframer circuit 13, a synchronous format conversion circuit 14 and an STS-1 transmission transmitting circuit 15 which are connected to the telephone set 2 in series in a direction from the telephone set 2 to the CMS apparatus 6 referred to hereinafter as the upward direction.

In the downward direction in the configuration described above, a DS0 signal for 192 subscribers transmitted by the CMS apparatus 6 is received by the STS-1 transmission receiving circuit 8 in an STS-1 exclusive frame format. It should be noted that the DS0 is an abbreviation for the Digital Signal - Level 0, a signal in a bandwidth of 64 Kbps conforming to the TR-008 standard of North America. The STS-1 stands for the Synchronous Transport Signal - Level 1 Concatenation, one of formats in a bandwidth of 51.84 Mbps conforming to SONET of North America.

The STS-1 signal received by the STS-1 transmission receiving circuit 8 is converted by the synchronous format conversion circuit 9 into a signal having a frame format specially synchronized to the system clock. The signal in the converted frame format is split by the multiplexing conversion/framer circuit 10 into a DS0 signal allocated to a specific subscriber and communication signaling information for the STM exchange 4. The audio-signal D/A conversion circuit 11 converts the digital DS0 signal from a digital signal into an analog audio-band signal which is then transmitted to the telephone set 2.

In the upward direction, on the other hand, an analog audio-band signal transmitted by the telephone set 2 is converted into a digital DS0 signal by the audio-signal A/D conversion circuit 12. The DS0 signal is multiplexed with communication signaling information of the STM exchange 4 into a signal having a special frame format by the multiplexing inverse conversion/deframer circuit 13. The signal in the special frame format is converted by the synchronous format conversion circuit 14 into an STS-1 signal which is then transmitted to the CMS apparatus 6 through the STS-1 transmission transmitting circuit 15.

As described above, in the STM exchange network system, signal processing and transmission of information by means of a synchronous signal are carried out in the system components, from the STM exchange 4 to the NBS apparatus 3. A band is allocated to each of telephone sets 2 installed in the subscribers' homes in advance. The bands are multiplexed in a special frame format in a signal conforming to SONET.

By the way, an ATM method can be introduced into the STM exchange network system described above in order to build an ATM exchange network shown in FIG. 16 by providing an ATM exchange 17, an HDT (Host Digital Terminal) station 18 connected to the ATM exchange 17 by an optical fiber, a BAS (Broad-band Access Shelf) apparatus 19 connected to the HDT station 18 by an optical fiber and STB (Set Top Box) apparatus 20 connected to the BAS apparatus 19 by a coaxial cable. Installed in the subscriber's home, the STB apparatus 20 terminates an ATM cell and has a function for compressing cell information. Terminal equipment such as the telephone set 2 and a video apparatus which is not shown in the figure is connected to the STB apparatus 20.

In the ATM exchange network described above, after being processed by the ATM exchange 17 and received by the HDT station 18, ATM cells are transmitted to the BAS apparatus 19. Then, in the BAS apparatus 19, coaxial cables which are bus-connected to the STB apparatuses 20 belonging to a plurality of subscribers transmit the ATM cells to the subscribers in order to provide telephone services thereto.

By the way, even though the ATM exchange network described above is superior in that signals of different bands and different communication services can be provided effectively with a high degree of quality, the ATM exchange network has characteristics that are not compatible with the STM exchange network built as a synchronous system like the existing telephone service system. If an apparatus which allows the two networks with different methods to be integrated into one is developed, the cost to modify the existing system and the cost to develop the apparatus itself will be high. On the top of that, there will also be a problem of poor operatability in addition to the high-cost problem.

SUMMARY OF THE INVENTION

It is therefore an object of the present invention to provide an economical ATM/STM coexistence network system having excellent operatability which system allows the ATM method to be introduced without modifying the existing system.

In accordance with an aspect of the present invention, there is provided an interface apparatus of an ATM/STM coexistence network system wherein a communication system based on the Asynchronous Transfer mode (ATM) and a communication system based on the Synchronous Transmission Mode (STM) coexist, the interface apparatus comprising: a first conversion means for converting a first input signal of the synchronous transfer mode into a signal with a cell format having an additional address for the asynchronous transfer mode and outputting the signal with the cell format as a first asynchronous transfer mode cell; a second conversion means for extracting an asynchronous transfer mode cell from a second input signal in which the asynchronous transfer mode cell is multiplexed in the synchronous transfer mode and outputting the extracted asynchronous transfer mode cell as a second asynchronous transfer mode cell; and an output-destination controlling means for determining output destinations in accordance with addresses shown in the first and second asynchronous transfer mode cells.

Preferably, the interface apparatus further comprises a control means for controlling the transmission of the first and second asynchronous transfer mode cells in such a way that, when the first and second asynchronous transfer mode cells are input at the same time, the first asynchronous transfer mode cell is transmitted to the output destination thereof with priority to the second asynchronous transfer mode cell. In addition, the control means recognizes the priority of the second asynchronous transfer mode cell determined in accordance with the type of the communication service thereof and transmits the second asynchronous transfer mode cell to the output destination in accordance with the recognized priority.

The above and other objects, features and advantages of the present invention and the manner of realizing them will become more apparent, and the invention itself will best be understood from a study of the following description and appended claims with reference to attached drawings showing some preferred embodiments of the invention.

DESCRIPTION OF THE PREFERRED EMBODIMENTS

Figure 1:
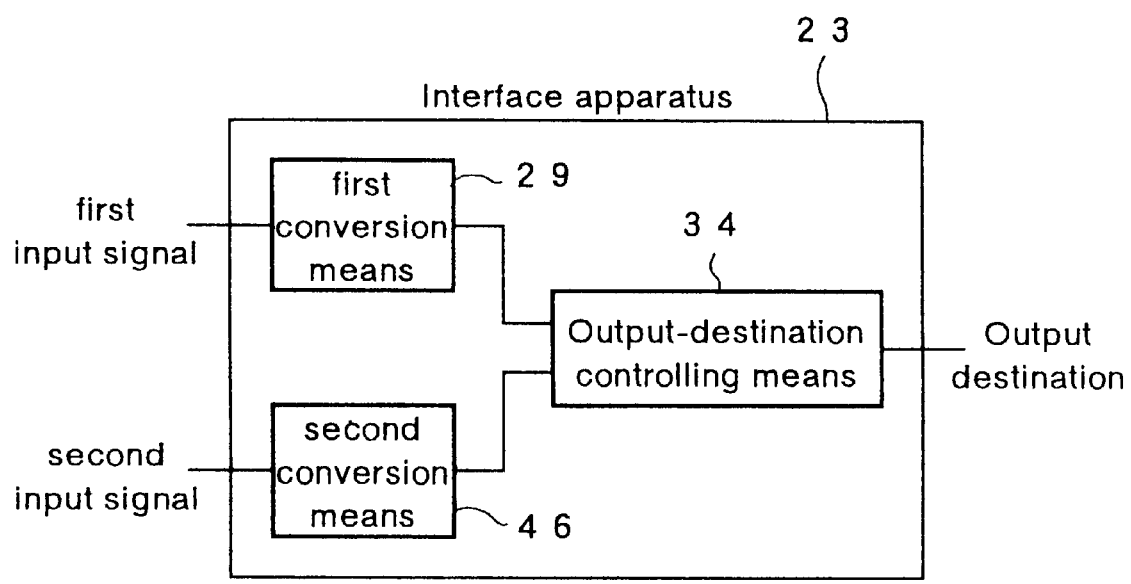
FIG. 1 is a block diagram used for explaining the principle of the present invention.

FIG. 1 is a block diagram used for explaining the principle of the present invention. As shown in the figure, an interface apparatus of an ATM/STM coexistence network system comprises a first conversion means 29 for converting a first input signal of the synchronous transfer mode into a signal with a cell format having an additional address for the asynchronous transfer mode and outputting the signal with the cell format as a first asynchronous transfer mode cell, a second conversion means 46 for extracting an asynchronous transfer mode cell from a second input signal in which the asynchronous transfer mode cell is multiplexed in the asynchronous transfer mode and outputting the extracted asynchronous transfer cell as a second asynchronous transfer mode cell and an output-destination controlling means 34 for determining output destinations in accordance with addresses shown in the first and second asynchronous transfer mode cells.

With the network system having such an interface apparatus, a first input signal of the synchronous transfer mode such as an audio signal is converted into an asynchronous transfer mode cell and, much like an asynchronous transfer mode cell (an ATM cell) based on the asynchronous transfer mode (ATM) method, a transmission destination can be recognized from an address shown in the cell, making it possible to transmit the audio signal and a signal of the ATM cell based on the ATM method to the recognized transmission destination.

Figure 2:
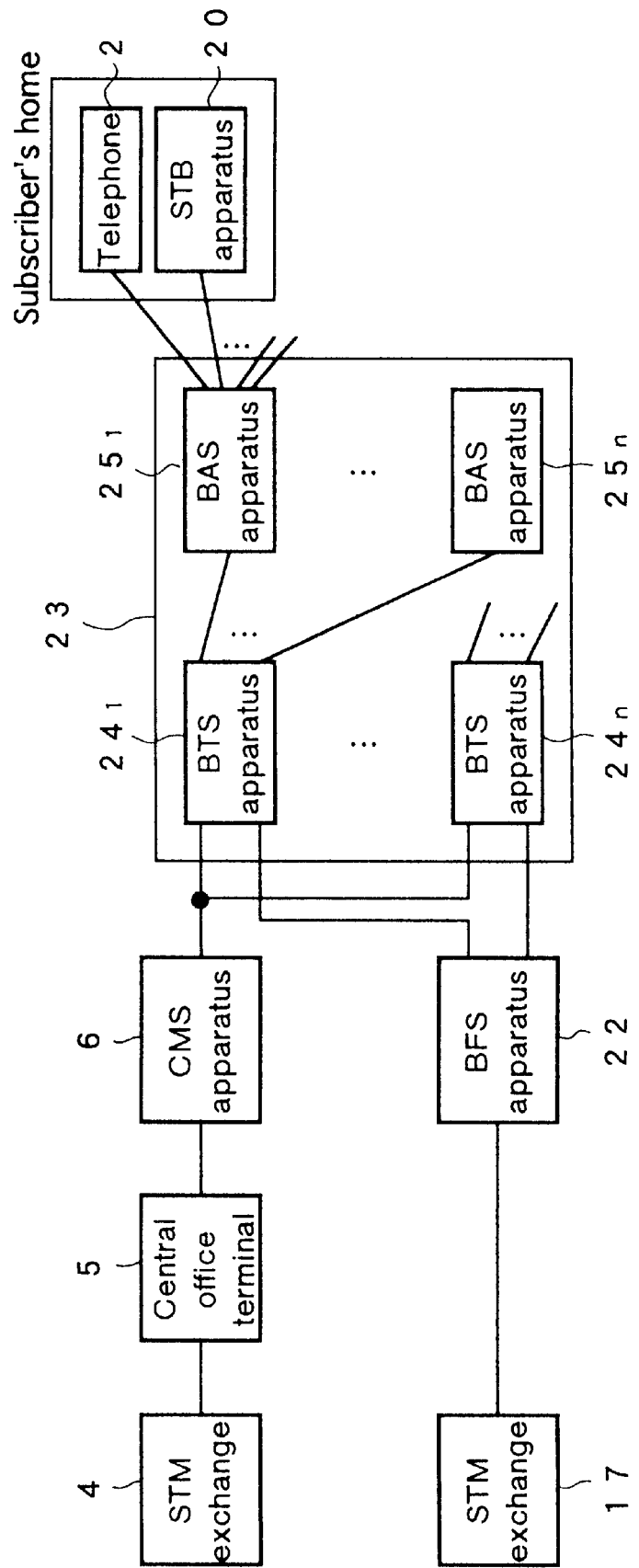
FIG. 2 is a block diagram showing the configuration of an embodiment implementing an ATM/STM coexistence network system provided by the present invention.
Figure 16:
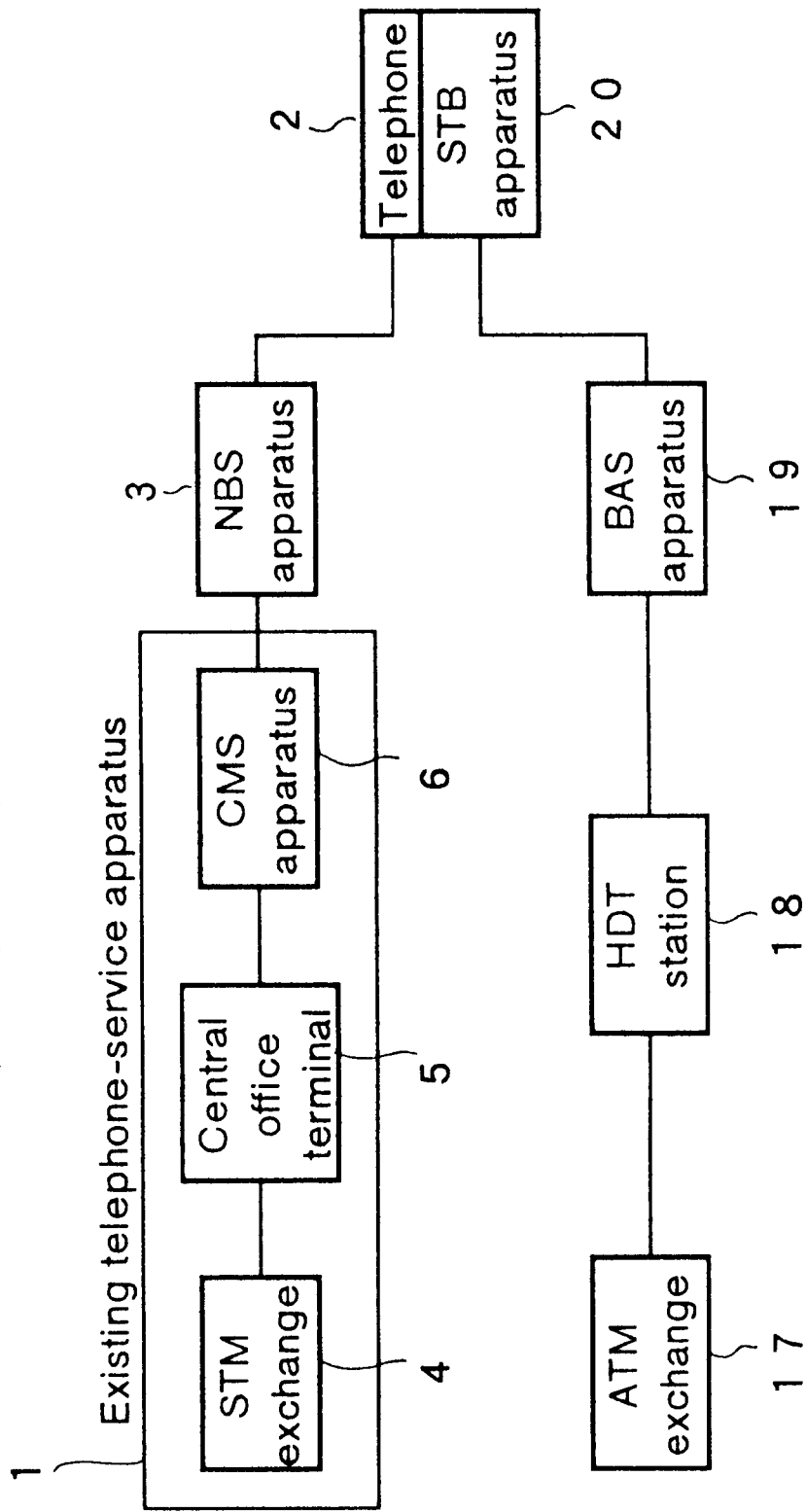
FIG. 16 is a block diagram showing the configuration of the conventional ATM/STM coexistence network system.
Figure 17:
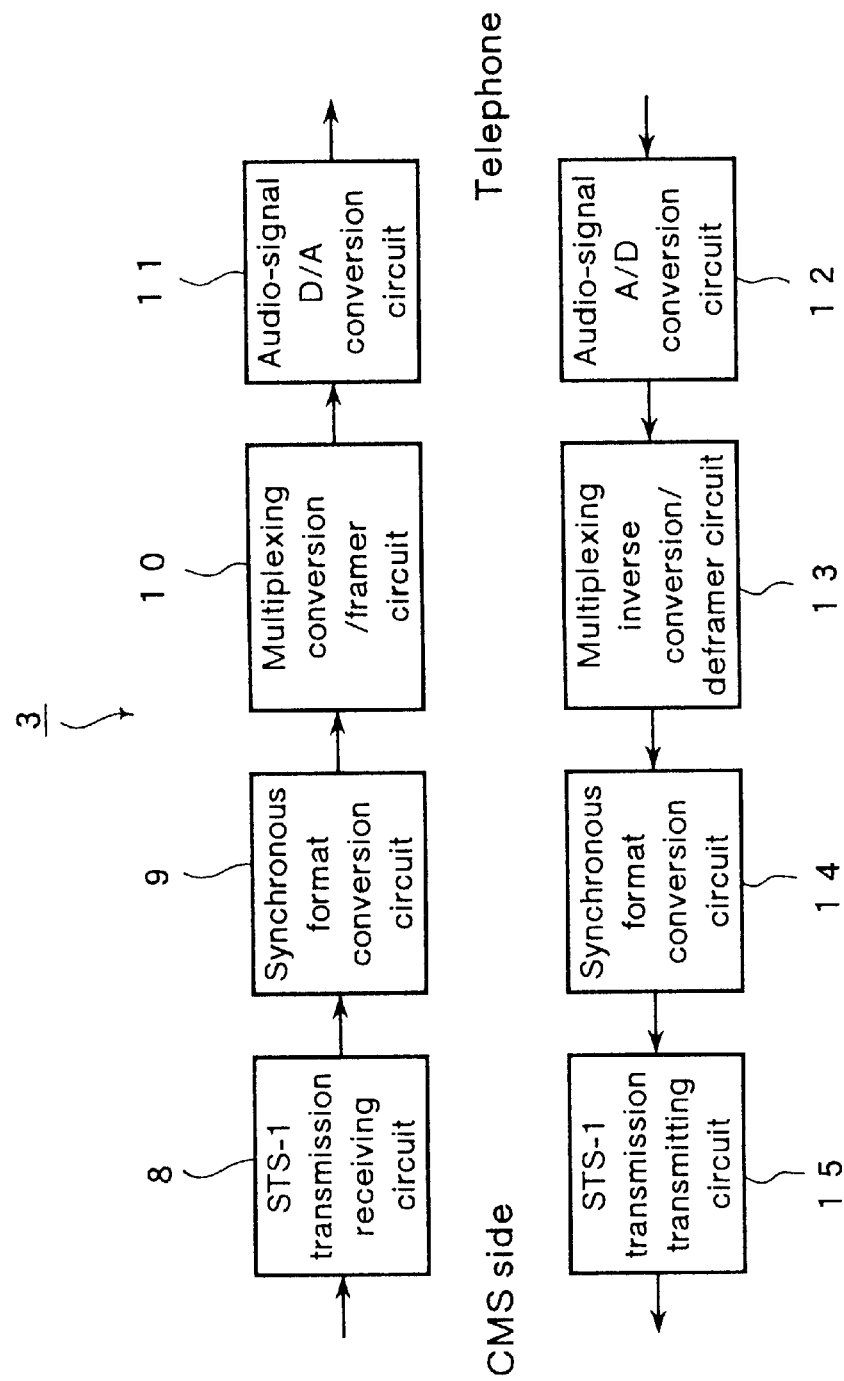
FIG. 17 is a block diagram showing the configuration of an NBS apparatus employed in the conventional ATM/STM coexistence network system shown in FIG. 16.

An embodiment of the present invention is described by referring to diagrams as follows. FIG. 2 is a block diagram showing the configuration of an embodiment implementing an ATM/STM coexistence network system provided by the present invention. Components shown in this figure which are identical with those of the conventional ATM/STM coexistence network system shown in FIG. 16 are denoted by the same reference numerals as those of FIG. 16 and the explanation of the identical components is not repeated. Reference numeral 22 shown in FIG. 2 is a B-FITL (Broadband-Fiber In The Loop) BFS (Broad-band Feeder Shelf) apparatus connected to the ATM exchange 17 whereas reference numeral 23 is an ATM/STM coexistence interface means, a component that characterizes the present invention.

The ATM/STM coexistence interface means which is used for handling transmission of signals of both the ATM and STM methods, comprises a plurality of B-FITL BTS (Broad-band Tributary Shelf) apparatuses $24_1$ to $24_n$, which are connected to the CMS apparatus 6 and the BFS apparatus 22, and a plurality of B-FITL BAS (Broad-band Access Shelf) apparatuses $25_1$ to $25_m$. The exchange side of the B-FITL BAS apparatuses $25_1$, to $25_m$ is connected to the B-FITL BTS apparatuses $24_1$ to $24_n$ while the subscriber-home side thereof is connected to the STB apparatus 20 and the telephone set 2 installed at the subscriber's home.

To put it in more detail, all the B-FITL BTS apparatuses $24_1$ to $24_n$ are connected to the BFS apparatus 22 and all the B-FITL BAS apparatuses $25_1$ to $25_m$ are connected to each of the B-FITL BTS apparatuses $24_1$ to $24_n$. In addition, a plurality of STB apparatuses 20 and telephone sets 2 installed at subscribers' homes are connected to each of the B-FITL BAS apparatuses $25_1$ to $25_m$. In the downward direction, the BFS apparatus 22 distributes OC-3c optical signals with mapped ATM cells processed in the ATM exchange 17 to the B-FITL BTS apparatuses 24. In the upward direction, on the other hand, the BFS apparatus 22 collects OC-3c optical signals from the B-FITL BTS apparatuses 24 and transmits the signals to the ATM exchange 17. It should be noted that the OC-3c is an abbreviation for the Optical Carrier Level - 3 having a band of 155.52 Mbps as prescribed by the GR-253 standard, a SONET standard of North America.

Figure 3:
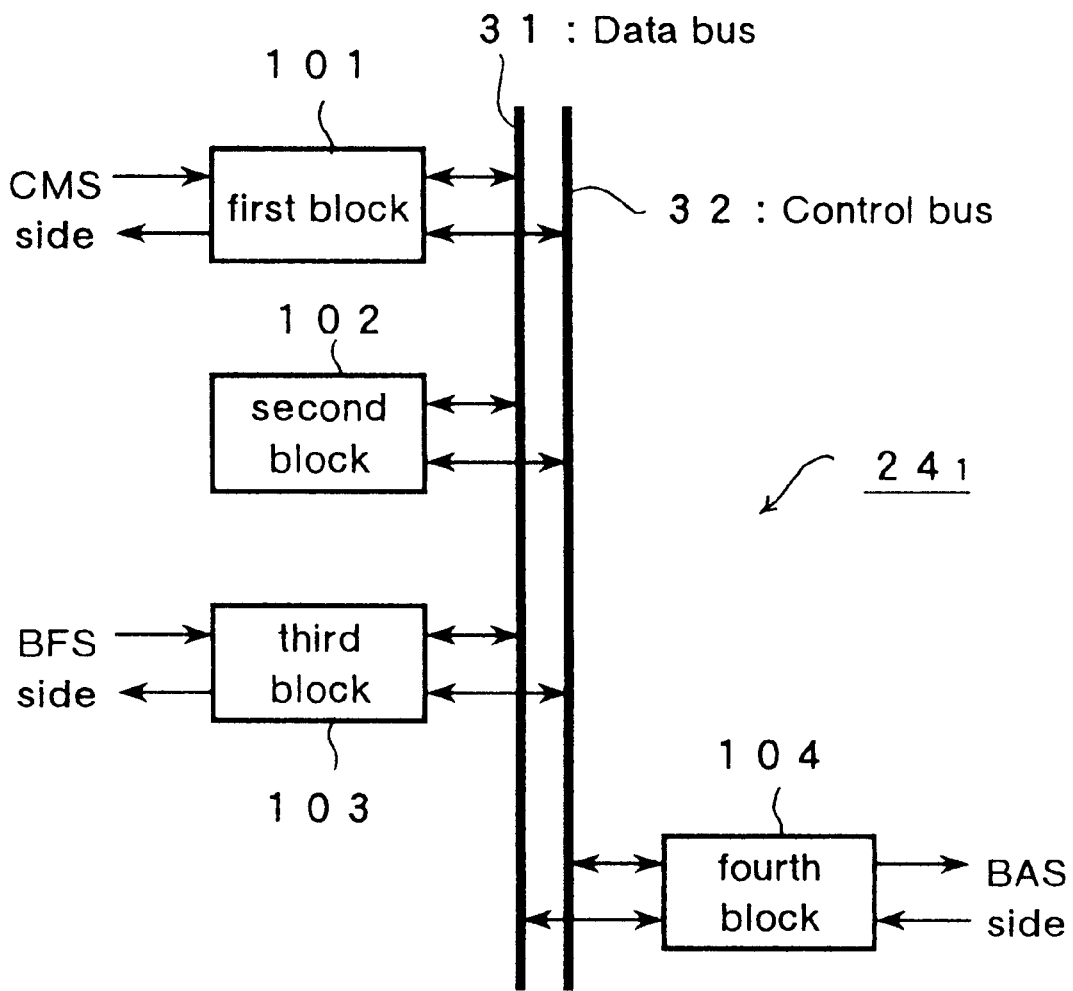
FIG. 3 is a block diagram showing the configuration of a BTS apparatus employed in the ATM/STM coexistence network system shown in FIG. 2.

The configuration of the B-FITL BTS apparatus $24_1$ to $24_n$ is explained by referring to FIGS. 3 to 7. Since all the B-FITL BTS apparatuses $24_1$ to $24_n$ have the same configuration, only one representative apparatus $24_1$ is described. As shown in FIG. 3, the B-FITL BTS apparatus $24_1$ comprises first to fourth blocks denoted by reference numerals 101, 102, 103 and 104 respectively. As shown in the figure, the first to fourth blocks 101 to 104 are connected to a data bus 31 and a control bus 32. The configurations of the first, second, third and fourth blocks 101 to 104 are shown in FIGS. 4 to 7 respectively.

Figure 4:
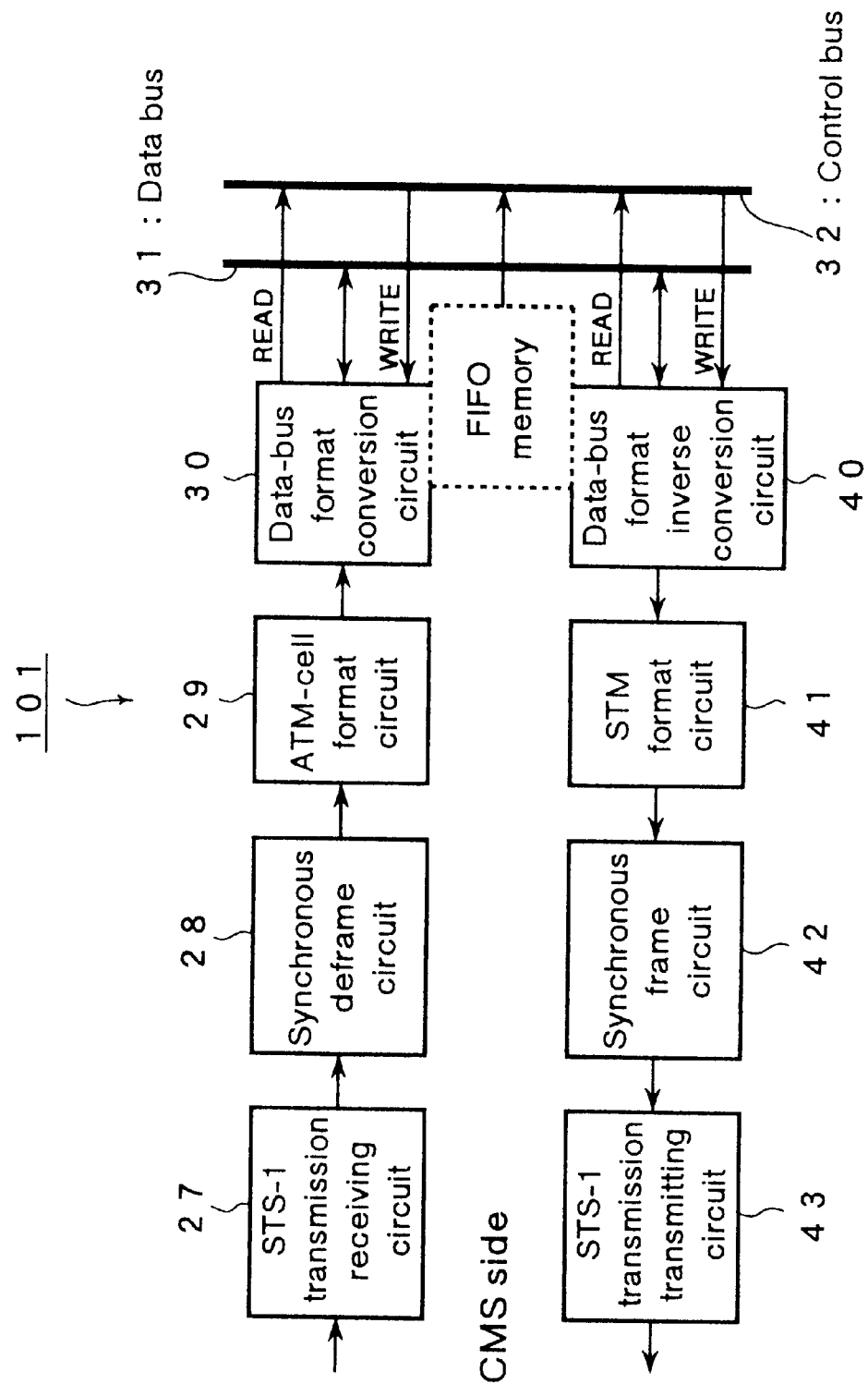
FIG. 4 is a block diagram showing the configuration of a first block of the BTS apparatus shown in FIG. 3.
Figure 5:
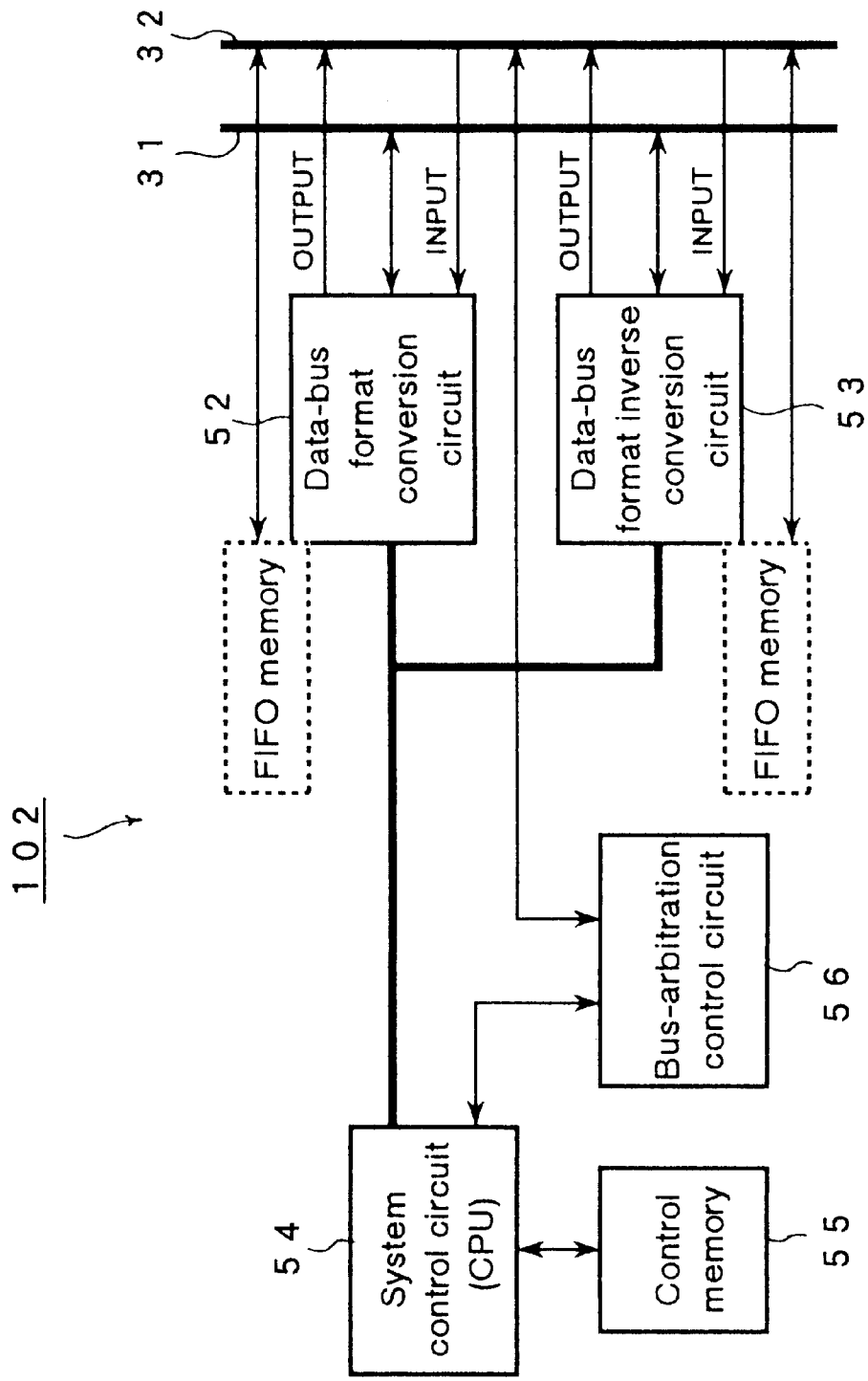
FIG. 5 is a block diagram showing the configuration of a second block of the BTS apparatus shown in FIG. 3.

As shown in FIG. 4, first of all, the first block 101 of the B-FITL BTS apparatus $24_1$ comprises an STS-1 transmission receiving circuit 27, a synchronous deframe circuit 28, an ATM-cell format circuit 29 and a data-bus format conversion circuit 30 which are connected to the CMS apparatus 6 in series in the downward direction from the CMS apparatus 6. The data-bus format conversion circuit 30 is connected to the data and control buses 31 and 32 on the downward-direction side. Connected in series to the data and control buses 31 and 32 in the downward direction from the data and control buses 31 and 32 are a data-bus format inverse conversion circuit 33, a QOS/ATR (Quality of Service/Address Translation) circuit 34, an ATM/STS-3c signal conversion circuit 35 and an OC-3c electro-optical conversion circuit 36 which is connected to the B-FITL BAS apparatus 25 on the downward direction side. The data-bus format inverse conversion circuit 33, the QOS/ATR (Quality of Service/Address Translation) circuit 34, the ATM/STS-3c signal conversion circuit 35 and the OC-3c electro-optical conversion circuit 36 constitute the fourth block 104 of the B-FITL BTS apparatus $24_1$ shown in FIG. 7.

In addition, connected in series to the B-FITL BAS apparatus 25 in the upward direction from the B-FITL BAS apparatus 25 are an OC-3c opto-electrical conversion circuit 37, an STS-3c/ATM signal conversion circuit 38, the QOS/ATR circuit 34 and a data-bus format conversion circuit 39 which is connected to the data and control buses 31 and 32 on the upward-direction side. The OC-3c opto-electrical conversion circuit 37, the STS-3c/ATM signal conversion circuit 38, the QOS/ATR circuit 34 and the data-bus format conversion circuit 39 form the fourth block 104 of the B-FITL BTS apparatus $24_1$ shown in FIG. 7. Connected in series to the data and control buses 31 and 32 in the upward direction from the data and control buses 31 and 32 are a data-bus format inverse conversion circuit 40, an STM format circuit 41, a synchronous frame circuit 42 and an STS-1 transmission transmitting circuit 42 which is connected to the CMS apparatus 6 on the upward-direction side. The data-bus format inverse conversion circuit 40, the STM format circuit 41, the synchronous frame circuit 42 and the STS-1 transmission transmitting circuit 43 form the first block 101 of the B-FITL BTS apparatus $24_1$ shown in FIG. 4.

Furthermore, connected in series to the BFS apparatus 22 in the downward direction from the BFS apparatus 22 are an OC-3c opto-electrical conversion circuit 45, an STS-3c/ATM signal conversion circuit 46 and a data-bus format conversion circuit 47 which is connected to the data and control buses 31 and 32 on the downward-direction side. Connected in series to the data and control buses 31 and 32 in the upward direction from the data and control buses 31 and 32 are a data-bus format inverse conversion circuit 48, an ATM/STS-3c signal conversion circuit 49 and an OC-3c electro-optical conversion circuit 50 which is connected to the BFS apparatus 22 on the upward-direction side. The OC-3c opto-electrical conversion circuit 45, the STS-3c/ATM signal conversion circuit 46, the data-bus format conversion circuit 47, the data-bus format inverse conversion circuit 48, the ATM/STS-3c signal conversion circuit 49 and the OC-3c electro-optical conversion circuit 50 form the third block 103 of the B-FITL BTS apparatus $24_1$ shown in FIG. 6.

By the same token, connected to the data and control buses 31 and 32 are a data-bus format conversion circuit 52 and a data-bus format inverse conversion circuit 53. A system control circuit (CPU) 54 is connected to the data-bus format conversion circuit 52 and the data-bus format inverse conversion circuit 53 while a control memory unit 55 is connected to the system control circuit 54. A bus-arbitration control circuit 56 is connected to the system control circuit 54 and the control bus 32. The data-bus format conversion circuit 52, the data-bus format inverse conversion circuit 53, the system control circuit 54, the control memory unit 55 and the arbitration control circuit 56 constitute the second block 102 of the B-FITL BTS apparatus $24_1$ shown in FIG. 5. It should be noted that the data-bus format conversion circuits 30, 39, 47 and 52 as well as the data-bus format inverse conversion circuits 33, 40, 48 and 53 each include a FIFO (First-in First-out) memory unit enclosed by a dashed line in the figures. The FIFO memory units each carry out a function of temporarily storing transmitted and received data in case the amount of the data is large.

Figure 8:
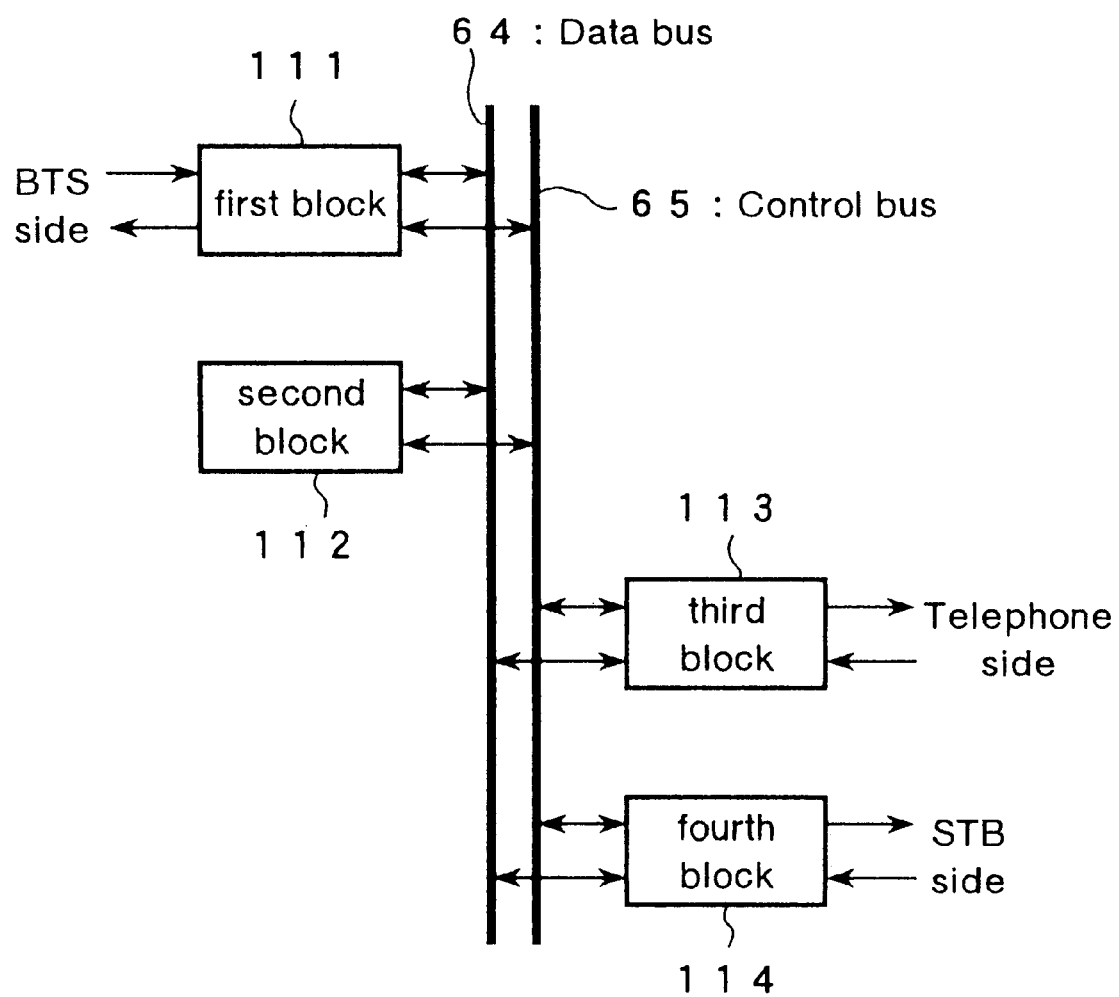
FIG. 8 is a block diagram showing the configuration of a BAS apparatus employed in the ATM/STM coexistence network system shown in FIG. 2.

Next, the configuration of the B-FITL BAS apparatus $25_1$ to $25_m$ is explained by referring to FIGS. 8 to 12. Since all the B-FITL BAS apparatuses $25_1$ to $25_m$ have the same configuration, only one representative apparatus $25_1$ is described. As shown in FIG. 8, the B-FITL BAS apparatus $25_1$ comprises first to fourth blocks denoted by reference numerals 111, 112, 113 and 114 respectively. As shown in the figure, the first to fourth blocks 111 to 114 are connected to a data bus 64 and a control bus 65. The configurations of the first, second, third and fourth blocks 111 to 114 are shown in FIGS. 9 to 12 respectively.

First of all, connected in series to the B-FITL BTS apparatus $24_1$ in the downward direction from the B-FITL BTS apparatus $24_1$ are an OC-c3 opto-electrical conversion circuit 60, an STS-3c/ATM signal conversion circuit 61, a QOS/ATR circuit 62 and a data-bus format conversion circuit 63 which is connected to the data bus 64 and the control bus 65 on the downward-direction side. The OC-c3 opto-electrical conversion circuit 60, the STS3c/ATM signal conversion circuit 61, the QOS/ATR circuit 62 and the data-bus format conversion circuit 63 constitute the first block 111 of the B-FITL BAS apparatus $25_1$ shown in FIG. 9. Connected in series to the data and control buses 64 and 65 in the downward direction from the data and control buses 64 and 65 are a data-bus format inverse conversion circuit 66, an STM format circuit 67, a multiplexing conversion/framer circuit 68 and an audio-signal D/A conversion circuit 69 which is connected to the telephone set 2 on the downward-direction side. Also connected in series to the data and control buses 64 and 65 in the downward direction from the data and control buses 64 and 65 are a data-bus format conversion circuit 70, an ATM/STS-1 multiplexing conversion circuit 71 and a 64-QAM (Quadrature Amplitude Modulation) analog conversion circuit 72 which is connected to the STB apparatus 20 on the downward-direction side. The data-bus format inverse conversion circuit 66, the STM format circuit 67, the multiplexing conversion/framer circuit 68, and the audio-signal D/A conversion circuit 69 constitute the third block 113 of the B-FITL BAS apparatus 25, shown in FIG. 11, while the data-bus format conversion circuit 70, the ATM/STS-1 multiplexing conversion circuit 71 and the 64-QAM analog conversion circuit 72 constitute the fourth block 114 of the B-FITL BAS apparatus $25_1$ shown in FIG. 12.

In addition, connected in series to the telephone set 2 in the upward direction from the telephone set 2 are an analog-signal A/D conversion circuit 73, a multiplexing inverse conversion/deframer circuit 74, an ATM format circuit 75 and a data-bus format conversion circuit 76 which is connected to the data and control buses 64 and 64 on the upward-direction side. The analog-signal A/D conversion circuit 73, the multiplexing inverse conversion/deframer circuit 74, the ATM format circuit 75 and the data-bus format conversion circuit 76 constitute the third block 113 of the B-FITL BAS apparatus $25_1$ shown in FIG. 11. On the other hand, connected in series to the STB apparatus 20 in the upward direction from the STB apparatus 20 are a QPSK (Quadri Phase Shift Keying) analog demodulation circuit 78, an STS-1/ATM multiplexing inverse conversion circuit 79 and a data-bus format conversion circuit 80 which is connected to the data and control buses 64 and 65 on the upward-direction side. The QPSK analog demodulation circuit 78, the STS-1/ATM multiplexing inverse conversion circuit 79 and the data-bus format conversion circuit 80 constitute the fourth block 114 of the B-FITL BAS apparatus $25_1$ shown in FIG. 12. Furthermore, connected in series to the data and control buses 64 and 65 in the upward direction from the data and control buses 64 and 65 are a data-bus format inverse conversion circuit 81, an ATM/STS-3c signal conversion circuit 82, the QOS/ATR circuit 62 and an OC-3c electro-optical conversion circuit 83 which is connected to the B-FITL BTS apparatus 24 on the upward-direction side. The data-bus format inverse conversion circuit 81, the ATM/STS-3c signal conversion circuit 82, the QOS/ATR circuit 62 and the OC-3c electro-optical conversion circuit 83 constitute the first block 111 of the B-FITL BAS apparatus $25_1$ shown in FIG. 9.

By the same token, connected to the data and control buses 64 and 65 are a data-bus format conversion circuit 84 and a data-bus format inverse conversion circuit 85. A system control circuit (CPU) 86 is connected to the data-bus format conversion circuit 84 and the data-bus format inverse conversion circuit 85 while a control memory unit 87 is connected to the system control circuit 86. A bus-arbitration control circuit 88 is connected to the system control circuit 86 and the control bus 65. The data-bus format conversion circuit 84, the data-bus format inverse conversion circuit 85, the system control circuit 86, the control memory unit 87 and the arbitration control circuit 88 constitute the second block 112 of the B-FITL BAS apparatus $25_1$ shown in FIG. 10. It should be noted that the data-bus format conversion circuits 63, 76, 80 and 84 as well as the data-bus format inverse conversion circuits 66, 70, 81 and 85 each include a FIFO (First-in First-out) memory unit enclosed by a dashed line in the figures. The FIFO memory units each carry out a function of temporarily storing transmitted and received data in case the amount of the data is large as described earlier.

Figure 13:
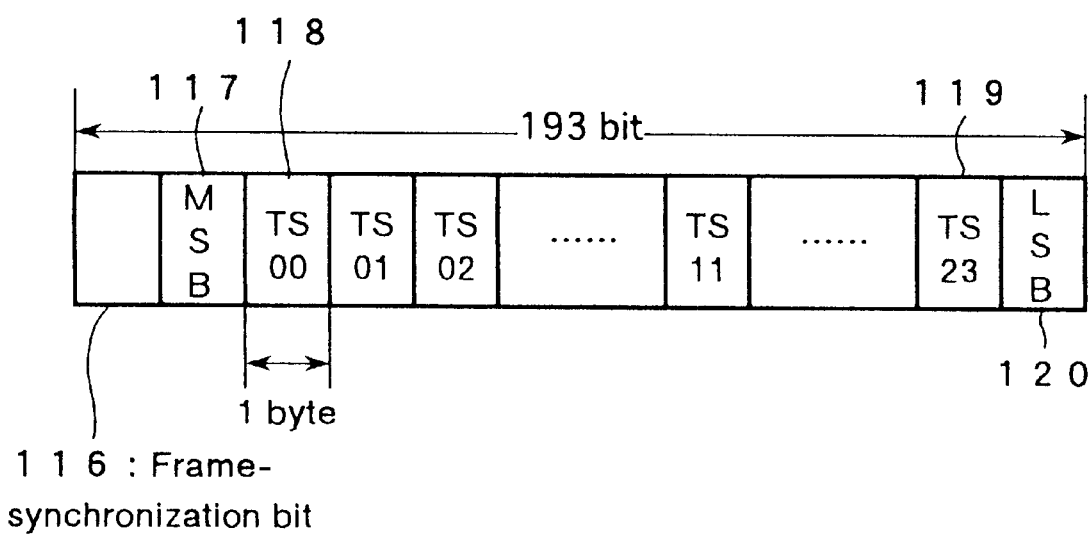
FIG. 13 is a diagram showing a frame format exclusively used for STS-1.

In such a configuration, a DS0 signal for 192 subscribers transmitted by the CMS apparatus 6 shown in FIG. 2 is received by the STS-1 transmission receiving circuit 27 shown in FIG. 4 in a STS-1 exclusive frame format shown in FIG. 13. As shown in FIG. 13, the frame format comprises 193 bits constituting a frame. Starting from the head of the frame, the 193 bits are a frame-synchronization bit denoted by reference numeral 116, an MSB (Most Significant Bit) denoted by reference numeral 117, 24 time slots TS00 to TS23 each having a length of 1 byte and a LSB (Least Significant Bit) denoted by reference numeral 120. The 24 time slots TS00 to TS23 are denoted by reference numerals 118 and 119.

The received STS-1 signal is converted by the synchronous deframe circuit 28 into a signal with an STM-frame format. The STM-format signal is then converted by the ATM-cell format circuit 29 into a signal with an ATM-cell format to which a VPI/VCI address used exclusively for an audio signal is added.

Figure 14:
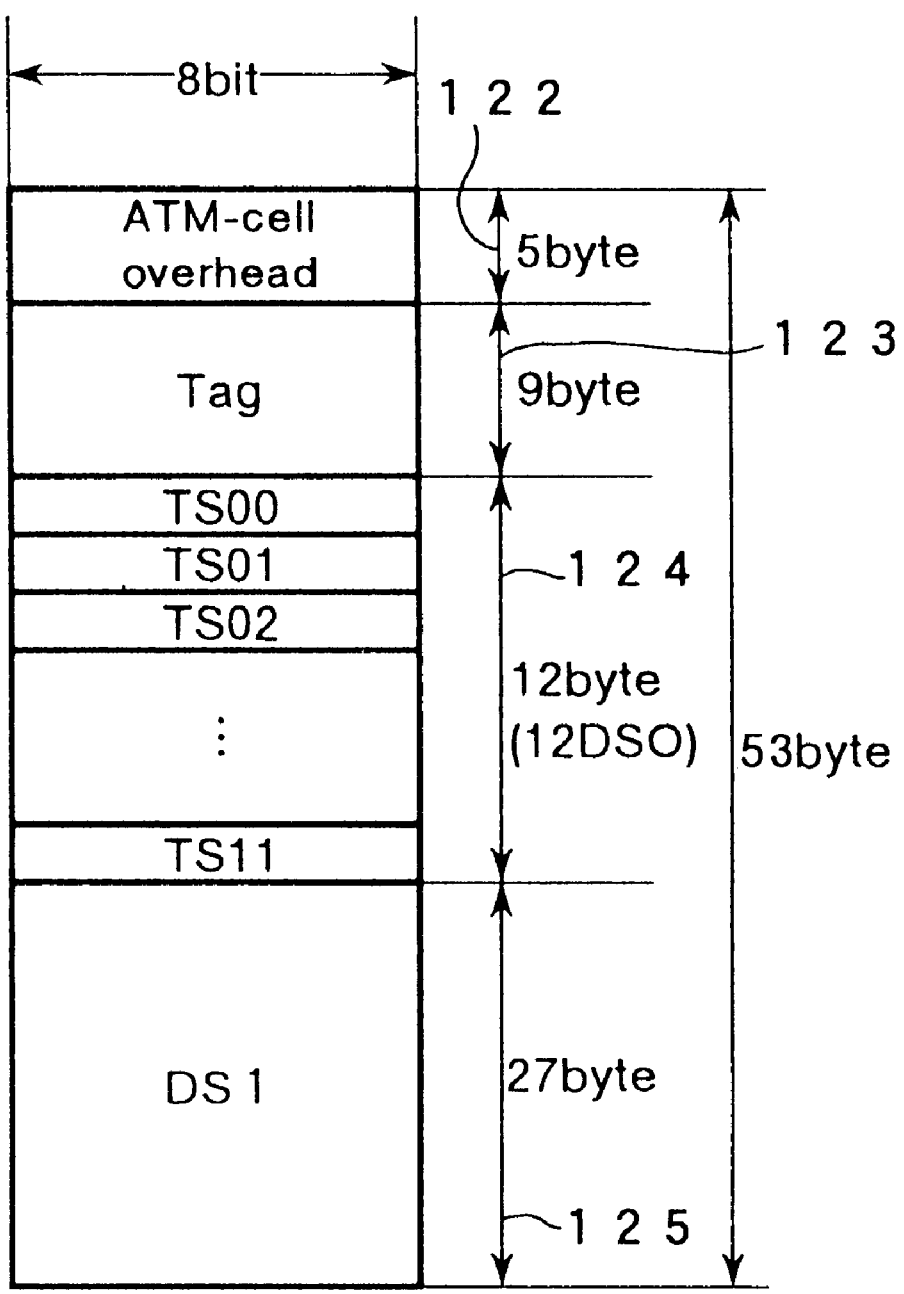
FIG. 14 is a diagram showing an ATM-cell format.

The ATM-cell format is shown in FIG. 14. As shown in the figure, the ATM-cell format has dimensions of 53 bytes in length and 8 bits in width. Starting from the head of the ATM-cell format, the 53-byte ATM-cell format comprises a 5-byte ATM-cell overhead denoted by reference numeral 122, a 9-byte tag denoted by reference numeral 123, 12-byte DS0 time slots TS00 to TS11 denoted by reference numeral 124 and 27-byte DS1 data denoted by reference numeral 125. The tag 123 contains signaling information, control information and data link information of the VPI/VCI address showing, among other things, the transmission destination cited earlier. The time slots TS00 to TS11 denoted by reference numeral 124 result from serial-to-parallel conversion of the time slots TS00 to TS11 shown in FIG. 13.

Figure 15:
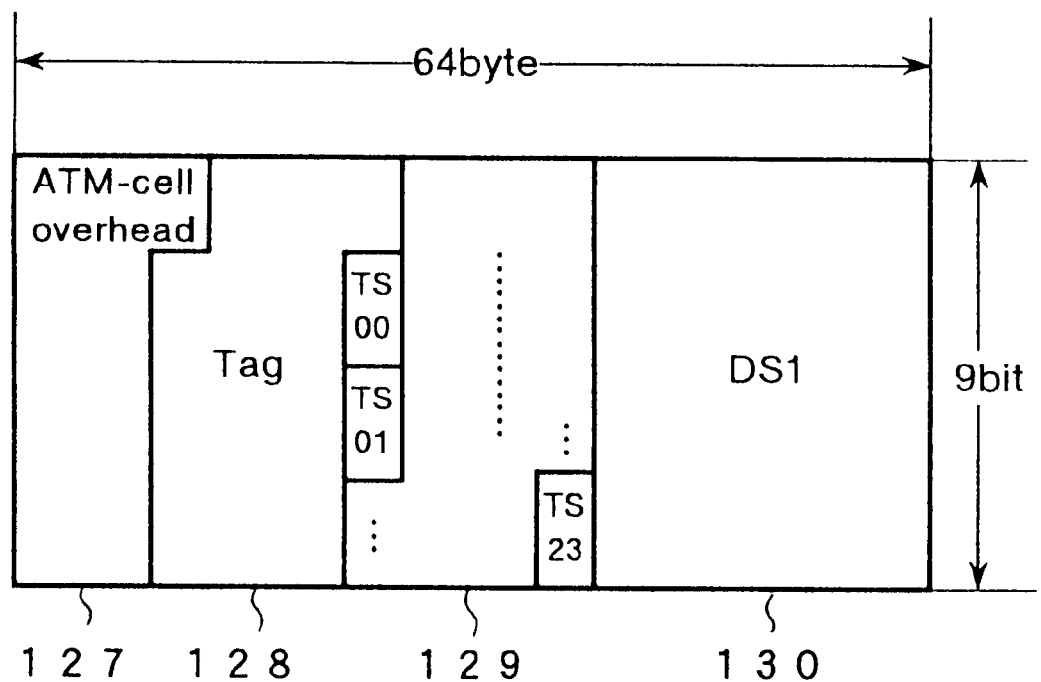
FIG. 15 is a diagram showing a bus format.

The ATM cell having the ATM-cell format described above is output to the data and control buses 31 and 32 through the data-bus format conversion circuit 30 for carrying out conversion on the ATM cell from a small unit into a slightly larger unit. The conversion carried out by the data-bus format conversion circuit 30 is a mapping process whereby ATM cells are mapped one after another so that, typically, rows (a) and columns (b) become a unit. A bus format resulting from the mapping process is shown in FIG. 15. As shown in the figure, the bus format which typically has dimensions of 9 bits×64 bytes comprises an ATM-cell overhead denoted by reference numeral 127, a tag denoted by reference numeral 128, DS0 time slots TS00 to TS23 denoted by reference numeral 129 and DS1 data denoted by reference numeral 130.

The mapping process described above makes high-speed communication possible. An ATM cell resulting from the mapping process is called a unit ATM cell. After the conversion, the data-bus format conversion circuit 30 issues a request for transmission to the system control circuit 54 through the control bus 32 and the bus-arbitration control circuit 56 shown in FIG. 5 to output the unit ATM cell to the data bus 31.

Figure 6:
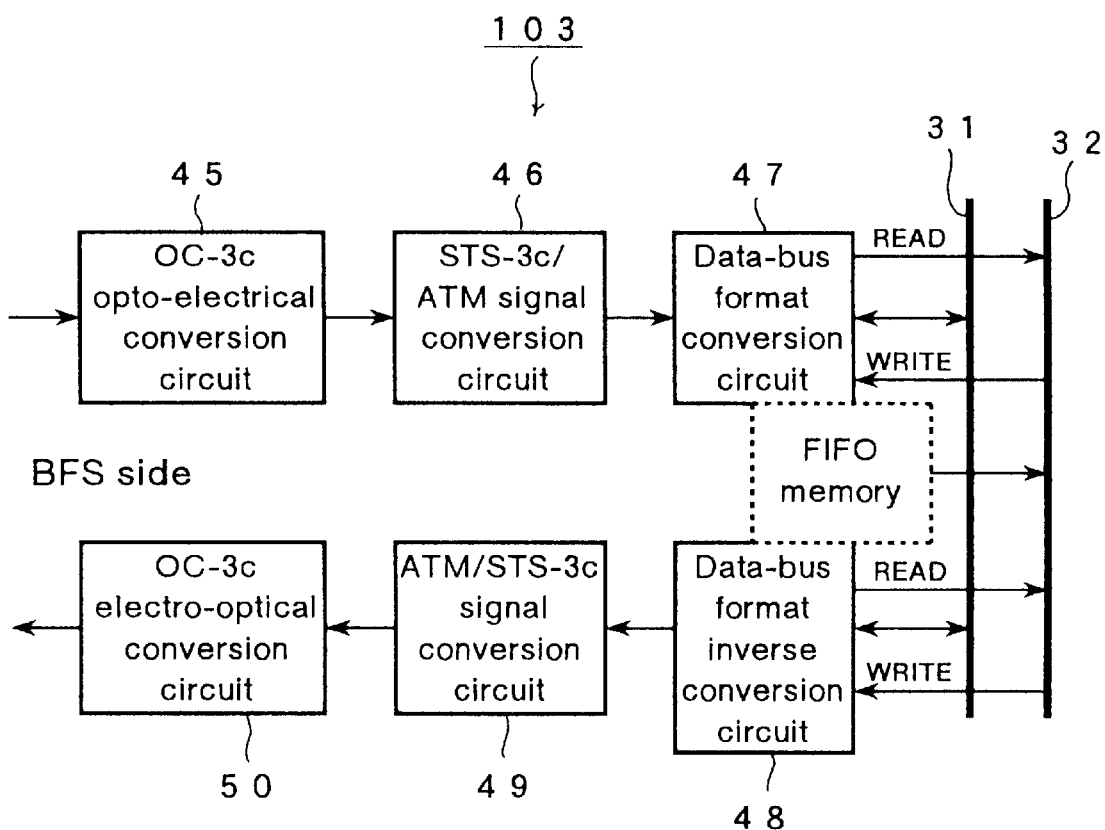
FIG. 6 is a block diagram showing the configuration of a third block of the BTS apparatus shown in FIG. 3.

On the other hand, an OC-3c optical signal transmitted by the BFS apparatus 22 shown in FIG. 2 is converted into an STS-3c electrical signal by the OC-3c opto-electrical conversion circuit 45 shown in FIG. 6 before being converted into an ATM cell by the STS-3c/ATM signal conversion circuit 46. Much like the data-bus format conversion circuit 30, the data-bus format conversion circuit 47 converts the ATM cell into a unit ATM cell. After the conversion, the data-bus format conversion circuit 47 issues a request for transmission to the system control circuit 54 through the control bus 32 and the bus-arbitration control circuit 56 shown in FIG. 5 to output the unit ATM cell to the data bus 31.

Here, when requests for transmission are issued by both the data-bus format conversion circuits 30 and 47 at the same time, the bus-arbitration control circuit 56 determines which transmission request has higher priority, carrying out arbitration control to transmit the request for transmission with higher priority to the system control circuit 54. For example, a request to transmit an audio signal is assigned a higher priority than a request to transmit a video signal. Receiving a request for transmission resulting from such arbitration control, the system control circuit 54 makes reference to a bus-utilization-state data base stored in the control memory unit 55 in order to determine whether or not the data bus 31 currently has an available transmission capacity and determines the degree of priority of the received signal from the type of the signal. Transmission of signals is controlled by the system control circuit 54 so that signals are transmitted to the data bus 31 in accordance with the order of priority.

In the case of a request for transmission of an audio signal, for example, the audio signal is transmitted to the data bus 31 with top priority. In this case, the system control circuit 54 outputs a transmission permitting trigger signal to the data-bus format conversion circuit 30 through the data-bus format conversion circuit 52 and the control bus 32. At that time, the data-bus format conversion circuit 52 converts the transmission permitting trigger signal into a signal with a format which can be recognized by the data-bus format conversion circuit 30.

When the transmission permitting trigger signal is received by the data-bus format conversion circuit 30, a gate in the data-bus format conversion circuit 30 is opened, allowing a unit ATM cell to be read in and output to the data bus 31. The transmitted unit ATM cell is supplied to the system control circuit 54 through the data-bus format inverse conversion circuit 53. At that time, the data-bus format inverse conversion circuit 53 converts the unit ATM cell transmitted through the data bus 31 into a signal with a format that can be recognized by the system control circuit 54.

Figure 7:
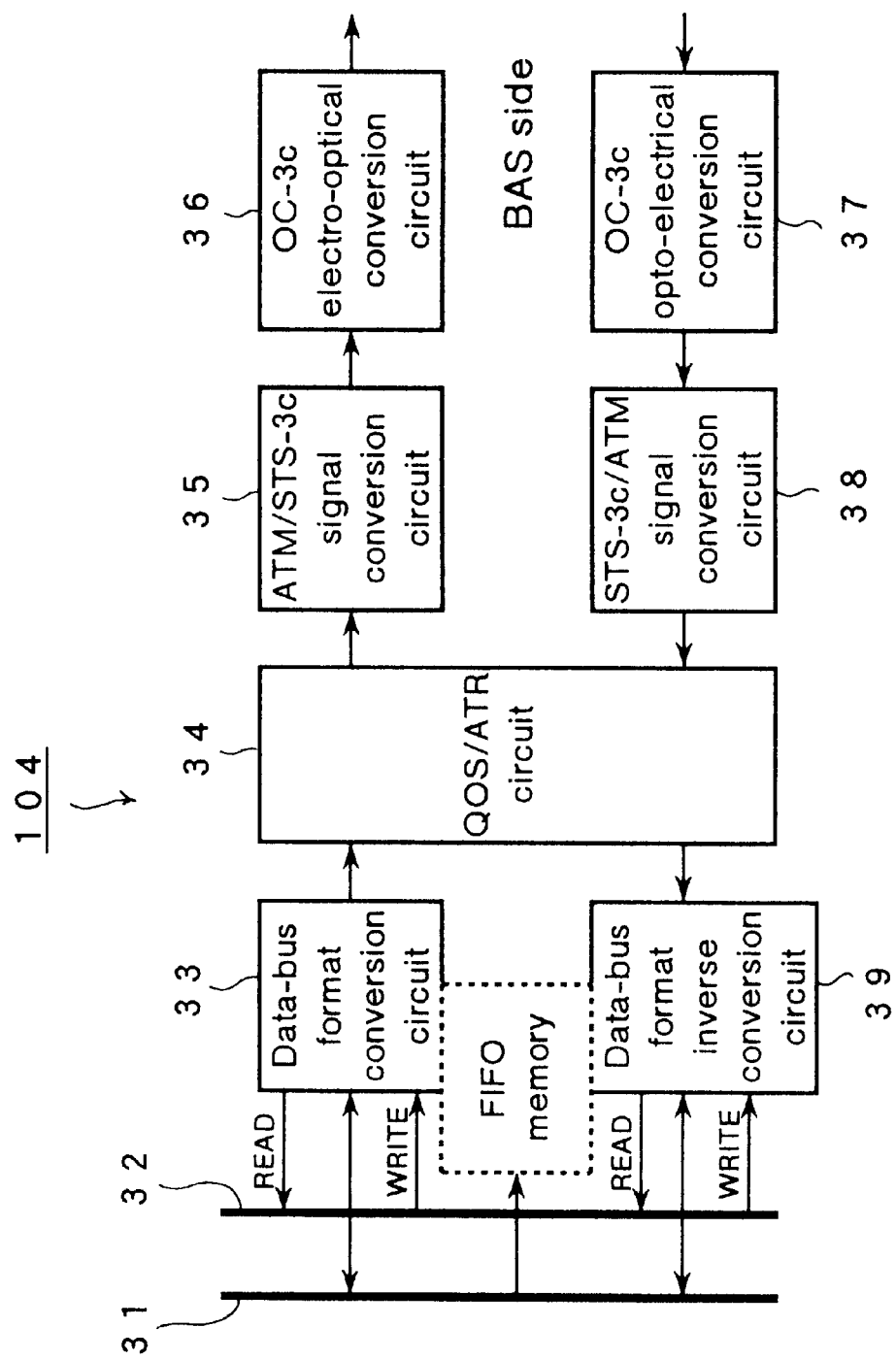
FIG. 7 is a block diagram showing the configuration of a fourth block of the BTS apparatus shown in FIG. 3.

Receiving the unit ATM cell, the system control circuit 54 makes reference to a data base stored in the control memory unit 55 in order to identify an output-destination circuit to which the unit ATM cell is to be supplied. The system control circuit 54 then outputs a reception permitting trigger signal for opening a gate in the output-destination circuit to the control bus 32 through the data-bus format conversion circuit 52. In this case, the data-bus format inverse conversion circuit 33 shown in FIG. 7 is identified as a destination circuit to receive the unit ATM cell output by the data-bus format conversion circuit 30 to the data bus 31. By writing the reception permitting trigger signal into the data-bus format inverse conversion circuit 33, the gate thereof is opened, allowing the unit ATM cell to be supplied to the data-bus format inverse conversion circuit 33.

In the data-bus format inverse conversion circuit 33, the unit ATM cell supplied thereto experiences a demapping process, the inverse of the mapping process carried out by the data-bus format conversion circuit 30 as described earlier. In the demapping process, the unit ATM cell is converted back into an ATM cell to be output to the QOS/ATR circuit 34. The QOS/ATR circuit 34 carries out conversion and inverse conversion of the ATM-cell address as well as service-quality pass control. The conversion of an ATM-cell address is processing to convert the ATM-cell address into a VPI/VCI address of the B-FITL BAS apparatus 25, a partner to which the ATM cell is to be delivered. The inverse conversion is the inverse of the conversion processing described above whereas the service-quality pass control is operations to assign the highest priority to a telephone service among various types of data received through ATM cells and to control the order to transmit ATM cells in accordance with priority assigned according to the types of the services conveyed by the ATM cells. The type of the service is determined by the VPI/VCI. The order to transmit ATM cells is therefore controlled by recognizing the types of the services from the VPI/VCI.

The ATM cell output by the QOS/ATR circuit 34 is mapped into a frame of an STS-3c signal by the ATM/STS-3c signal conversion circuit 35. In other words, in the ATM/STS-3c signal conversion circuit 35, an asynchronous signal is mapped into a synchronous signal. The STS-3c signal output by the ATM/STS-3c signal conversion circuit 35 is then converted by the OC-3c electro-optical conversion circuit 36 into an STC-3c optical signal which is transmitted to the B-FITL BAS apparatus 25 shown in FIGS. 2 and 8.

Figure 9:
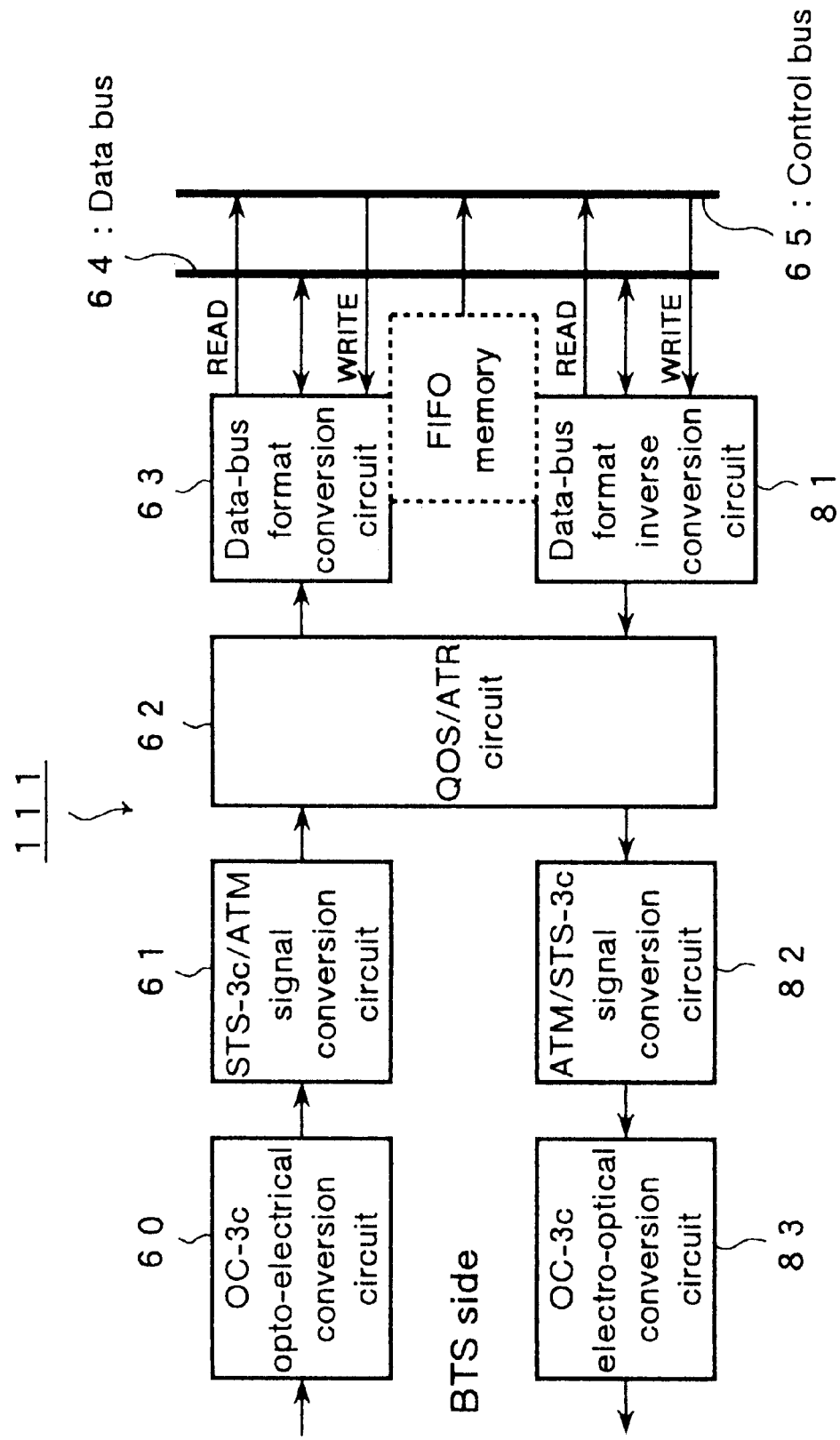
FIG. 9 is a block diagram showing the configuration of a first block of the BAS apparatus shown in FIG. 8.

The transmitted OC-3c optical signal is converted into an STS-3c electrical signal by the OC-3c opto-electrical conversion circuit 60 shown in FIG. 9 before being converted back into an ATM cell by the STS-3c/ATM signal conversion circuit 61. The ATM cell output by the STS-3c/ATM signal conversion circuit 61 is then output to the data-bus format conversion circuit 63 through the QOS/ATR circuit 62. The data-bus format conversion circuit 63 converts the ATM cell into a unit ATM cell. After the conversion, the data-bus format conversion circuit 63 issues a request for transmission to the system control circuit 86 through the control bus 65 and the bus-arbitration control circuit 88 shown in FIG. 10 to output the unit ATM cell to the data bus 64.

Receiving a request for transmission resulting from such arbitration control, the system control circuit 86 makes reference to a data base stored in the control memory unit 87, carrying out control so that the transmission request signal is transmitted to the data bus 64. The control opens a gate in the data-bus format conversion circuit 63, allowing the unit ATM cell to be output to the data bus 64. The output unit ATM cell is supplied to the system control circuit 86 through the data-bus format inverse conversion circuit 85 for converting the unit ATM cell into an ATM cell. Receiving the ATM cell, the system control circuit 86 recognizes whether the ATM cell is an ATM cell with an STM format (that is, an ATM cell of an audio signal) or an ATM cell of the ATM method (that is, an ATM cell of a video signal or others). If the ATM cell is an audio-signal ATM cell, the system control circuit 86 outputs a reception permitting trigger signal for opening a gate of the data-bus format inverse conversion circuit 66 shown in FIG. 11. If the ATM cell is a video-signal ATM cell or another, on the other hand, the system control circuit 86 carries out control to open a gate in the data-bus format inverse conversion circuit 70 shown in FIG. 12.

With the gate in the data-bus format inverse conversion circuit 66 opened, the unit ATM cell is supplied to the data-bus format inverse conversion circuit 66 where a demapping process is carried out to convert the unit ATM cell back into an ATM cell. The ATM cell output by the data-bus format inverse conversion circuit 66 is converted by the STM format circuit 67 into a signal with an STM-frame format. The signal with the STM-frame format is split by the multiplexing conversion/framer circuit 68 into a DS0 signal allocated to a specific subscriber and communication signaling information of the STM exchange 4. The DS0 signal experiences conversion from a digital signal into an analog signal in the audio-signal D/A conversion circuit 69. The analog signal output by the audio-signal D/A conversion circuit 69 is finally transmitted to the telephone set 2.

With the gate of the data-bus format inverse conversion circuit 70 opened, on the other hand, the unit ATM cell is supplied to the data-bus format inverse conversion circuit 70 where a demapping process is also carried out to convert the unit ATM cell back to an ATM cell. The ATM cell output by the data-bus format inverse conversion circuit 70 is converted into an STS-1 signal by the ATM/STS-1 multiplexing conversion circuit 71 before being supplied to the 64-QAM analog modulation circuit 72 to undergo 64-QAM analog modulation. A signal output by the 64-QAM analog modulation circuit 72 is then transmitted to the STB apparatus 20.

Conversely, in the upward direction, an analog audio-band signal output by the telephone set 2 is converted into a digital DS0 signal by the audio-signal A/D conversion circuit 73. The digital DS0 signal is multiplexed with communication signaling information of the STM exchange 4 in a special frame format by the multiplexing inverse conversion/deframer circuit 74. The signal with an STM format, that is, the signal with the special frame format, is then converted into a signal with an ATM-cell format by the ATM-cell format circuit 75. The ATM cell, that is the signal with the ATM-cell format, is then converted into a unit ATM cell by the data-bus format conversion circuit 76.

Figure 10:
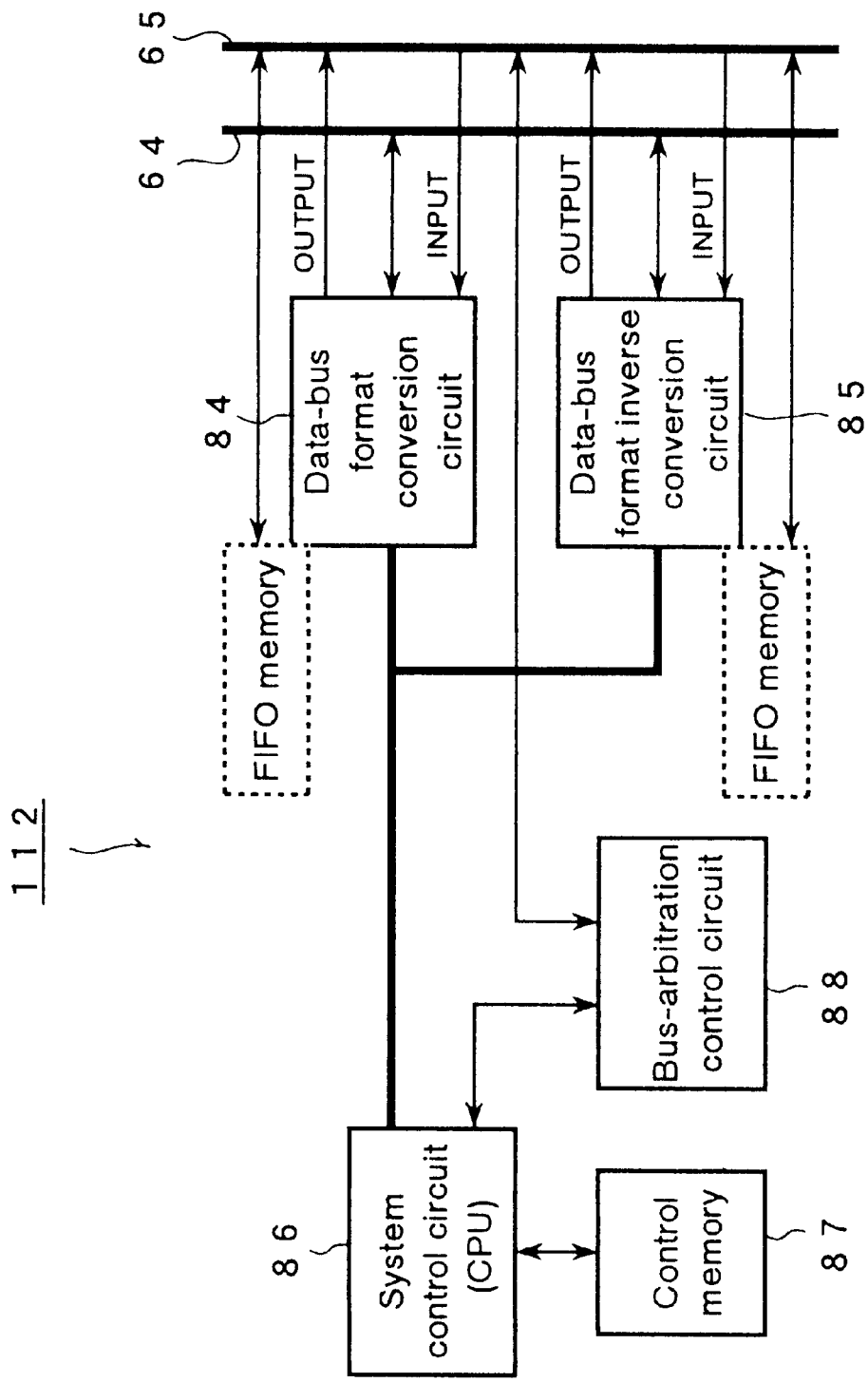
FIG. 10 is a block diagram showing the configuration of a second block of the BAS apparatus shown in FIG. 8.
Figure 11:
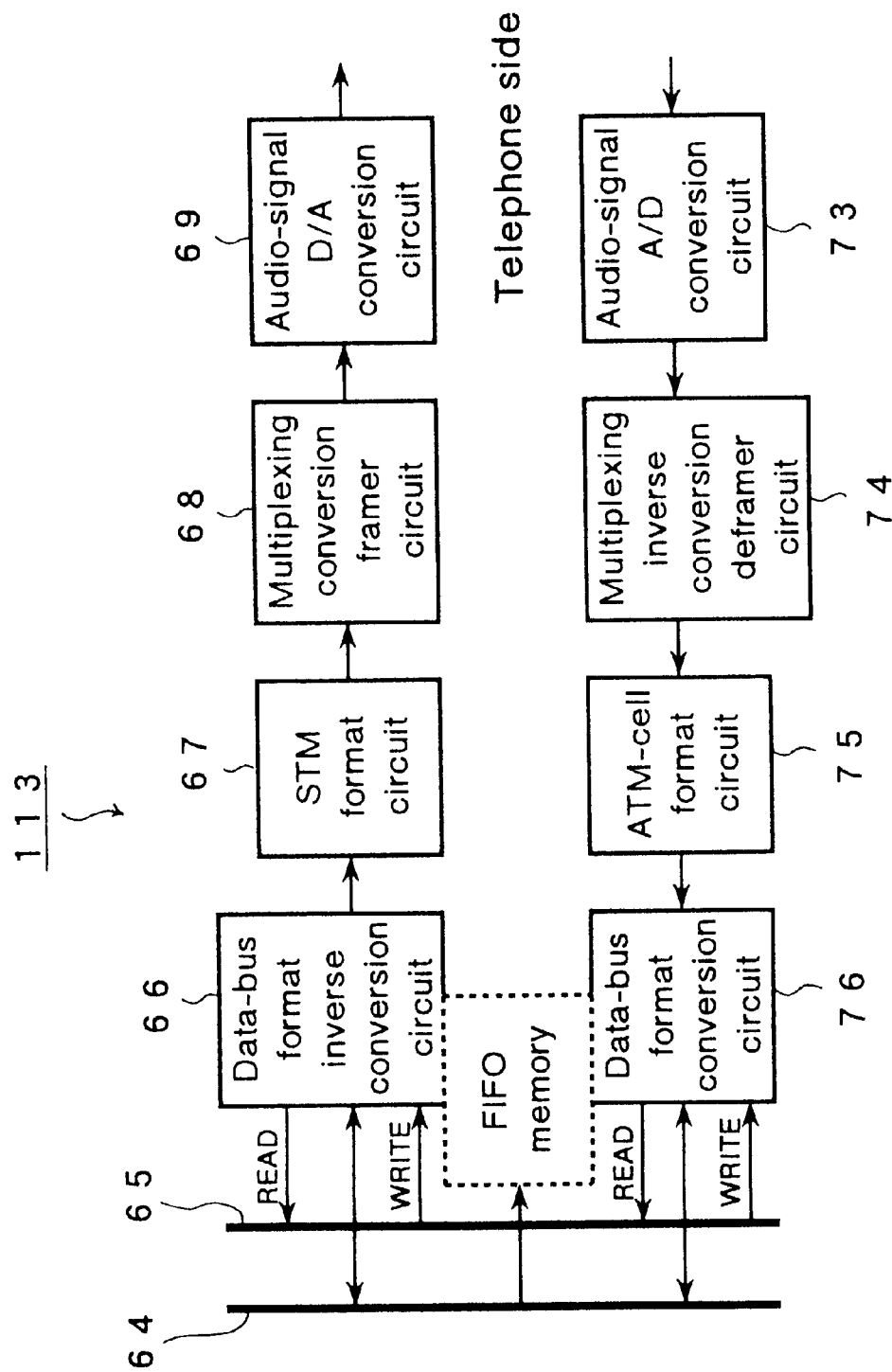
FIG. 11 is a block diagram showing the configuration of a third block of the BAS apparatus shown in FIG. 8.
Figure 12:
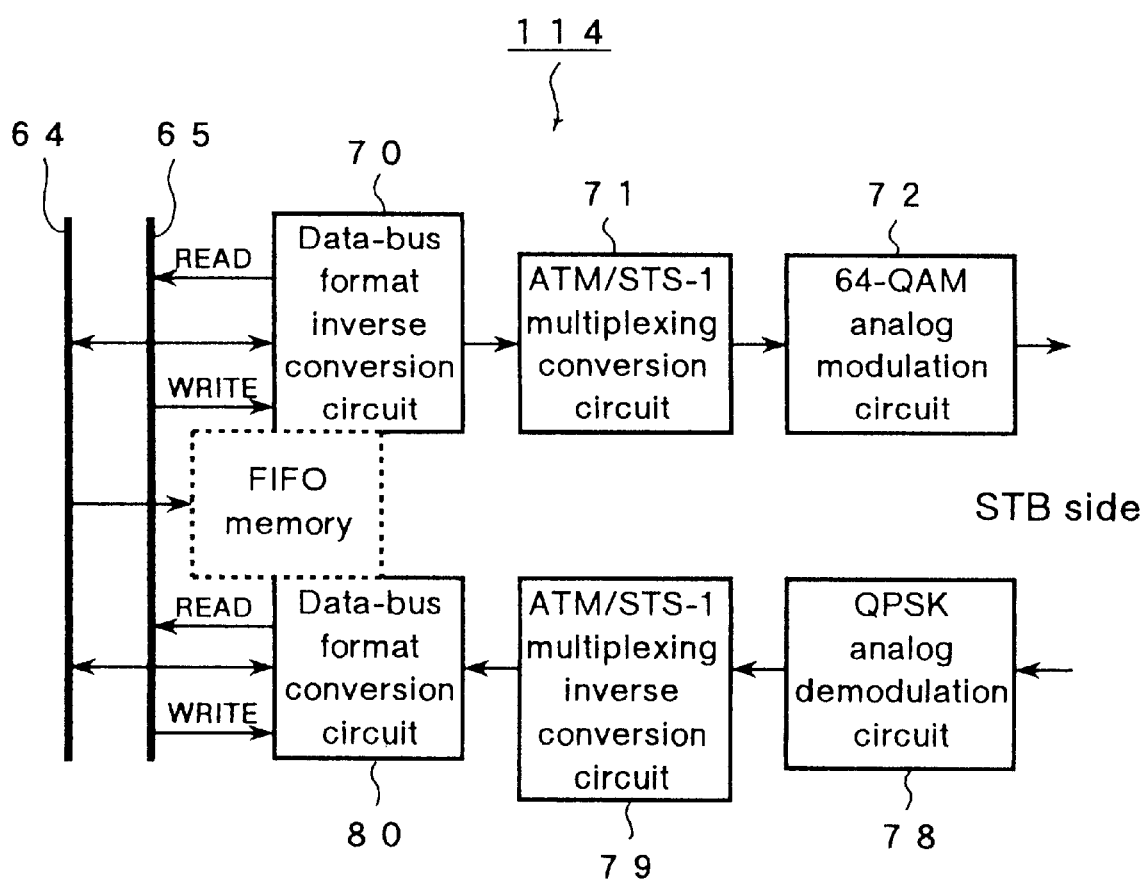
FIG. 12 is a block diagram showing the configuration of a fourth block of the BAS apparatus shown in FIG. 8.

After the conversion, the data-bus format conversion circuit 76 issues a request for transmission to the system control circuit 86 through the control bus 65 and the bus-arbitration control circuit 88 shown in FIG. 10 to output the unit ATM cell to the data bus 64.

On the other hand, an STS-1 analog modulated signal output by the STB apparatus 20 experiences QPSK analog demodulation in the QPSK analog demodulation circuit 78 before being converted into an ATM cell by the STS-1/ATM multiplexing inverse conversion circuit 79. The ATM cell output by the STS-1/ATM multiplexing inverse conversion circuit 79 is converted into a unit ATM cell by the data-bus format conversion circuit 80. After the conversion, the data-bus format conversion circuit 80 issues a request for transmission to the system control circuit 86 through the control bus 65 and the bus-arbitration control circuit 88 shown in FIG. 10 to output the unit ATM cell to the data bus 64. Here, when requests for transmission are issued by both the data-bus format conversion circuits 76 and 80 at the same time, the bus-arbitration control circuit 88 determines which transmission request has higher priority, carrying out arbitration control to transmit the request with higher priority to the system control circuit 86. A request issued by the system of the telephone set 2 has priority higher than a request output by the STB apparatus 20.

Receiving a request for transmission resulting from such arbitration control, the system control circuit 86 makes reference to a bus-utilization-state data base stored in the control memory unit 87 in order to determine whether or not the data bus 64 currently has an available transmission capacity and determines the degree of priority of the received signal from the type of the signal. Transmission of signals is controlled by the system control circuit 86 so that signals are transmitted to the data bus 64 in accordance with the order of priority. In this case, first of all, this control opens the gate of the data-bus format conversion circuit 76 to read the unit ATM cell output by the system of the telephone set 2 and output the unit ATM cell to the data bus 64. Later on, the gate of the data-bus format conversion circuit 80 is opened.

The output unit ATM cell is supplied to the system control circuit 86 through the data-bus format inverse conversion circuit 85. Receiving the unit ATM cell, the system control circuit 86 opens a gate of the data-bus format inverse conversion circuit 81, allowing the unit ATM cell to be supplied to the data-bus format inverse conversion circuit 81. The unit ATM cell supplied to the data-bus format inverse conversion circuit 81 experiences a demapping process therein, being converted back into an ATM cell which is then supplied to the ATM/STS-3c signal conversion circuit 82 through the QOS/ATR circuit 62. In the ATM/STS-3c signal conversion circuit 82, the ATM cell is mapped into a frame of an STS-3c signal and converted into the STS-3c signal before being supplied to the OC-3c electro-optical conversion circuit 83 for conversion into an OC-3c optical signal which is then transmitted to the B-FITL BTS apparatus 24 shown in FIGS. 2 and 3.

The transmitted OC-3c optical signal is converted into an STS-3c electrical signal by the OC-3c opto-electrical conversion circuit 37 shown in FIG. 7 before being converted into an ATM cell by the STS-3c/ATM signal conversion circuit 38. The ATM cell is then output to the data-bus format conversion circuit 39 through the QOS/ATR circuit 34. The ATM cell is converted into a unit ATM cell by the data-bus format conversion circuit 39. After the conversion, the data-bus format conversion circuit 39 issues a request for transmission to the system control circuit 54 through the control bus 32 and the bus-arbitration control circuit 56 shown in FIG. 5 to output the unit ATM cell to the data bus 31.

Receiving the request for transmission, the system control circuit 54 carries out control so that the transmission-request signal is output to the data bus 31. The control opens a gate in the data-bus format conversion circuit 39, allowing the unit ATM cell to be output to the data bus 31. The output unit ATM cell is supplied to the system control circuit 54 through the data-bus format inverse conversion circuit 53 for converting the unit ATM cell into an ATM cell. Receiving the ATM cell, the system control circuit 54 recognizes whether the ATM cell is an ATM cell with an STM format (that is, an ATM cell of an audio signal) or an ATM cell of the ATM method (that is, an ATM cell of a video signal or others). If the ATM cell is an audio-signal ATM cell, the system control circuit 54 outputs a reception permitting trigger signal for opening a gate of the data-bus format inverse conversion circuit 40. If the ATM cell is a video-signal ATM cell or another, on the other hand, the system control circuit 54 carries out control to open a gate in the data-bus format inverse conversion circuit 48.

With the gate in the data-bus format inverse conversion circuit 40 opened, the unit ATM cell is supplied to the data-bus format inverse conversion circuit 40 where a demapping process is carried out to convert the unit ATM cell back into an ATM cell. The ATM cell output by the data-bus format inverse conversion circuit 40 is then converted by the STM format circuit 41 into a signal with an STM-frame format. The signal with the STM-frame format is converted into an STS-1 signal by the synchronous frame circuit 42 before being output to the CMS apparatus 6 through the STS-1 transmission transmitting circuit 43.

With the gate of the data-bus format inverse conversion circuit 48 opened, on the other hand, the unit ATM cell is supplied to the data-bus format inverse conversion circuit 48 where a demapping process is also carried out to convert the unit ATM cell back to an ATM cell. The ATM cell output by the data-bus format inverse conversion circuit 48 is converted into an STS-3c signal by the ATM/STS-3c signal conversion circuit 49. The STS-3c signal is then converted into an STS-3c optical signal by OC-3c electro-optical conversion circuit 50 before being supplied to the BFS apparatus 22.

In addition, a FIFO memory unit enclosed by a dashed line in the figures is used for temporarily storing a cell at the time a data-bus format conversion circuit or a data-bus format inverse conversion circuit associated with the FIFO memory unit makes an access to the data bus. The size of the FIFO memory unit is determined in accordance with the number of cells transmitted or received to or from the data bus, the traffic frequency and differences in priority among services. Furthermore, the QOS/ATR circuits 34 and 62 recognizes the VPI/VCI address of a cell in order to determine the type of service of the cell and connects a FIFO memory unit with the required storage capacity to the data bus. In this case, a telephone-signal ATM cell which must be transmitted with top priority is output to a FIFO memory unit having the smallest storage capacity.

The ATM/STM coexistence interface means 23 of the ATM/STM coexistence network system described above allows signals of both the ATM and STM methods to be transmitted. As a result, by connecting the existing telephone service apparatus 1 to the ATM/STM coexistence interface means 23 in the configuration of an existing STM exchange network, an ATM exchange network can be integrated into the existing system by merely connecting the ATM exchange 17, the BFS apparatus 22 and the STB apparatus 20 anew to the ATM/STM coexistence interface means 23.

If a new apparatus which allows the two networks with different methods to be integrated into one is developed as is the case with the conventional system, the cost to modify the existing system and the cost to develop the new apparatus itself will be high. On the top of that, there will also be a problem of poor operatability in addition to the high-cost problem. With the ATM/STM coexistence interface means 23, however, the problems described above can be solved. In addition, the ATM/STM coexistence interface means 23 can also be applied to a network of both the SONET area and the SDH (Synchronous Digital Hierarchy) area of specifications other than the North American specifications.

As described above, the present invention provides an economical ATM/STM coexistence network system having excellent operatability which system allows the ATM method to be introduced without modifying the existing system based on the STM method.

What is claimed is:

1. An interface apparatus of an ATM/STM coexistence network system wherein a communication method based on an asynchronous transfer mode (ATM) coexists with a communication method based on a synchronous transfer mode (STM), said interface apparatus comprising:

first conversion means for converting a first input signal of the synchronous transfer mode into a signal with a cell format having an additional address for the asynchronous transfer mode, and outputting said signal with said cell format as a first asynchronous transfer mode cell;

second conversion means for extracting an asynchronous transfer mode cell having a destination address from a multiplexed asynchronous second input signal and outputting said extracted asynchronous transfer mode cell having said destination address as a second asynchronous transfer mode cell; and an output-destination controlling means for determining output destinations in accordance with said addresses shown respectively in said first and second asynchronous transfer mode cells.

2. An interface apparatus according to claim 1, further comprising control means for carrying out control so as to output said first asynchronous transfer mode cell to said output destination thereof with priority to said second asynchronous transfer mode cell in case said first and second asynchronous transfer mode cells are received at the same time.

3. An interface apparatus according to claim 2, wherein said control means recognizes priority of said second asynchronous transfer mode cell set in accordance with a type of a communication service of said second asynchronous transfer mode cell and transmits said second asynchronous transfer mode cell to said output destination thereof in accordance with said recognized priority.

4. An interface apparatus according to claim 2, further comprising:

third conversion means for converting each of said first asynchronous transfer mode cell output by said first conversion means and said second asynchronous transfer mode cell output by said second conversion means into a unit asynchronous transfer mode cell by mapping each of said first and second asynchronous transfer mode cells into an asynchronous transfer mode cell format of a predetermined unit and outputting said unit asynchronous transfer mode cell to a bus in accordance with control carried out by said control means; and inverse conversion means for converting said unit asynchronous transfer mode cell output to said bus back into said first or second asynchronous transfer mode cell.

5. An interface apparatus according to claim 4, further comprising transmission/reception signal conversion means for allowing a first synchronous transmission network to be connected to an input side of said first conversion means and for allowing a second synchronous transmission network different from said first synchronous transmission network to be connected to an output side of said output-destination controlling means.

* * * * *